Nov. 9, 1965  J. G. E. COHN ETAL  3,216,861
FUEL CELL
Filed May 28, 1962
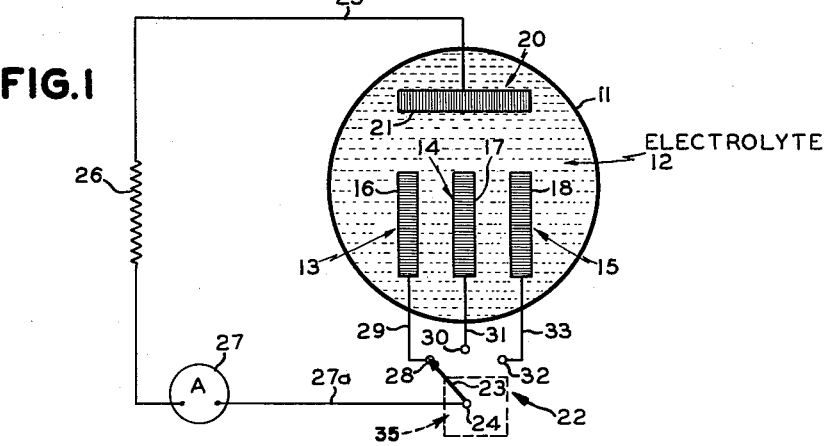
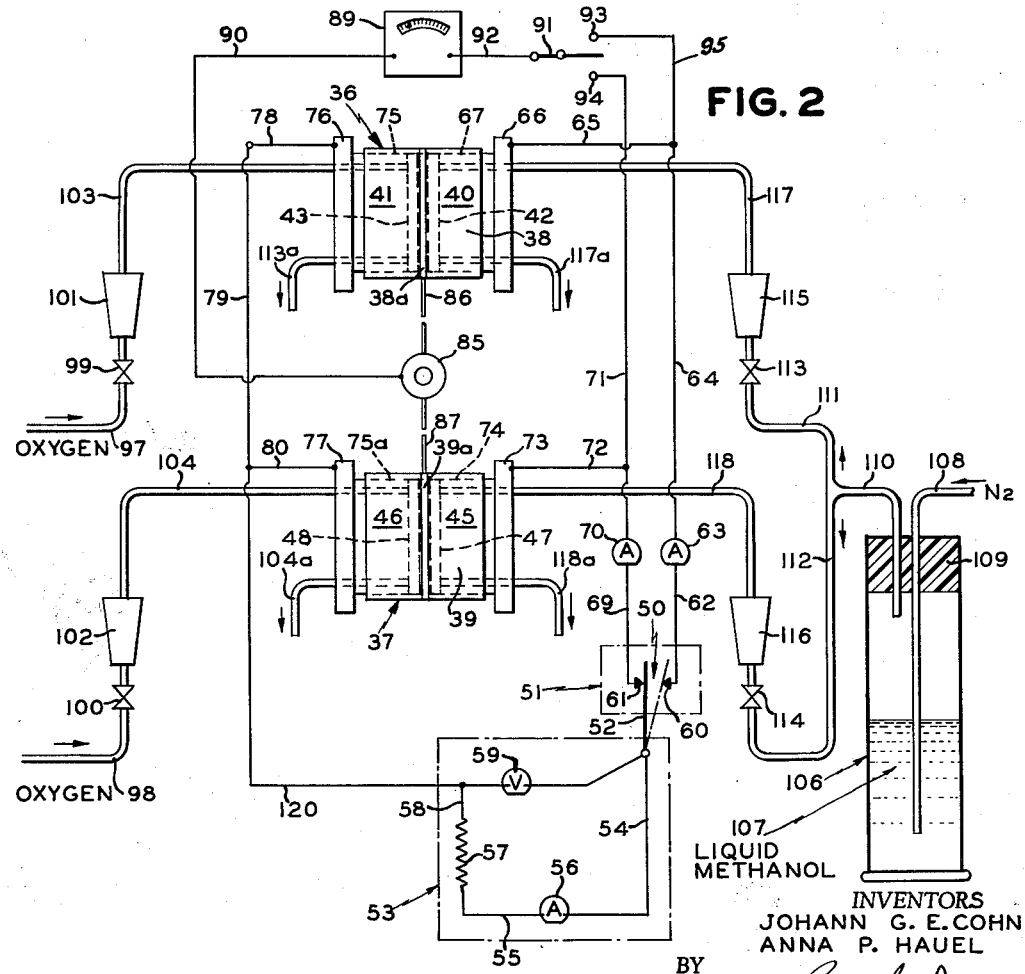
INVENTORS
JOHANN G. E. COHN
ANNA P. HAUEL
BY Roger J. Drew
ATTORNEY

United States Patent Office 3,216,861
Patented Nov. 9, 1965

3,216,861
FUEL CELL
Johann G. E. Cohn and Anna P. Hauel, West Orange,
N.J., assignors to Engelhard Industries, Inc., Newark,
N.J., a corporation of Delaware
Filed May 28, 1962, Ser. No. 198,274
18 Claims. (Cl. 136—86)

This invention relates to an electricity-producing process and apparatus and more especially to fuel cells characterized by relatively low anodic polarization and high efficiencies and high current densities.

One problem encountered in the operation of fuel cells employing acid electrolytes in the past has been the polarization, i.e. loss of potential, occurring during current withdrawal of the fuel cell anode. This polarization is marked with the use of organic fuels, particularly at high current densities.

In accordance with the present invention, a new and improved process and electricity-producing apparatus for the production of direct current electrical energy are provided which minimize the undesirable anodic polarization occurring during the continuous current flow. The process involves the overcoming of excessive anodic polarization of a fuel cell system by operating the anode or anodes under discontinuous, preferably cyclical conditions in order to alternate periods of polarization with periods of depolarization.

A fuel cell system making possible such cyclical operation may contain one or more fuel cells and each cell may contain one or more anodes, the anodes being the fuel electrodes. The fuels employed by such systems are organic fuels, e.g. methanol or formic acid and the electrolytes are of sufficient acidity to expel the $CO_2$ formed upon the oxidation of such organic fuels. Cyclical variation of current flow is suitably accomplished whether one or several anodes are present by a suitable automatic time switch. The time periods of load and open circuit for each anode, or variable load without circuit interruption for each anode, and the number of anodes required for a particular system are a function of the kinetics of polarization and depolarization of such anodes in the particular cell under consideration.

In the embodiment of the invention with multiple anodes in a single fuel cell, the anodes are spaced apart or electronically segmented in an electrolyte. According to the invention, electrical current is periodically withdrawn from an individual anode until prior to maximum polarization, and, after cessation of current withdrawal and during periods of non-withdrawal of current from such anode whereby the anode undergoes depolarization, electrical current is withdrawn from another of the anodes until prior to maximum polarization of this anode. Then current is again withdrawn from the other anode which has undergone depolarization. This periodic withdrawal of current from first one anode and then another anode provides an electrical energy production method which constitutes a considerable improvement for the reasons: (1) anodic polarization is minimized; (2) smooth continuous current output is achieved by the alternating of the load from anode to anode; (3) high cell efficiencies are attained; and (4) high current densities are attained which is important in connection with (3).

In another embodiment of the method, two fuel cells are provided with each comprising an electrolyte having an anode or fuel electrode and a cathode or oxygen electrode spaced apart from each other in each electrolyte. Fuel is maintained in contact with the anode in each cell, and an oxidizer gas is maintained in contact with the cathode in each cell. Periodically electric current is withdrawn from the anode of one of the cells until prior to maximum polarization of the anode, and then current is withdrawn from the anode of the other cell during periods of non-withdrawal of current from the first-mentioned cell until prior to maximum polarization of this anode. Thereafter current is withdrawn from the anode of the first-mentioned cell which has undergone depolarization. This embodiment is also an improvement in the art for the reasons previously set forth.

The time period of loading, i.e. current withdrawal from each anode and of open circuit of the anode is a function of the rate of formation and of decay of anodic polarization. Typical time periods of loading each anode are from about 0.005–100 seconds.

The invention will be more clearly understood by reference to the accompanying drawings wherein:

FIGURE 1 is a schematic diagram of apparatus of this invention including an electrical circuit and switch means for closing the circuit through any of a plurality of spaced apart anodes of a fuel cell of the apparatus; and FIGURE 2 is a schematic diagram of apparatus and circuits illustrating another embodiment of the teachings of this invention.

Referring now to FIGURE 1, fuel cell 10 comprises container 11 having electrolyte 12 therein, for instance acid electrolyte, e.g. sulfuric acid electrolyte. In accordance with the invention, fuel electrodes or anodes 13, 14 and 15 are spaced apart from each other in electrolyte 12. Anodes 13, 14 and 15 are in sheet or platelike form and in parallel arrangement as shown, and include a body or supporting portion 16, 17 and 18 respectively which is preferably of a porous material. The body portions of the anodes preferably have deposited thereon a catalyst, for example, a precious metal catalyst with the platinum group metals being preferred among the precious metals. Platinum, palladium, rhodium, iridium, ruthenium or mixtures thereof are preferred catalysts of the platinum group metals. Gold and silver are also included as precious metals, although these metals are not preferred catalysts herein. The catalytic metal is desirably in the form of a block, although carrier-supported catalysts may be used. The oxidizing electrode or cathode 20 is a hollow porous electrode and includes a body or supporting portion 21 preferably of a porous material, for instance of porous carbon. The body portion of cathode 20 preferably also has deposited thereon a catalyst such as for example one or more of the catalysts previously enumerated with regard the anodes 13, 14 and 15.

The catalytic electrodes can be prepared by depositing the catalyst on carrier material, such as a porous fibrous material, by a suitable method. Examples of suitable methods of depositing a catalyst on a carrier are depositing the catalyst from a paste or suspension, or reducing or precipitating metal from its salt solution, or electroplating by methods favoring a large-area deposit.

Switch 22 includes movable contact arm 23 pivotally mounted at 24. The electric circuit includes cathode 20, conductor 25, resistance load 26, ammeter 27, conductor 27a, switch 22, electrolyte 12 and one of the anodes. The fuel, e.g. 1–5 percent methanol in 3 N $H_2SO_4$, is contained in the electrolyte. Means (not shown) are provided for passing an oxidizing gas, for instance air in contact with cathode 20, this means being a conduit leading from the source of the oxidizing gas exterior of the cell into the cell and into the interior of the hollow porous cathode 20.

In accordance with the invention, the anode 13 is periodically loaded by movement of contact arm 23 into contact with fixed contact 28 electrically connected to anode 13 by conductor 29. After withdrawal of direct electrical current from anode 13 for a non-lengthy period, preferably from about 0.005–2 seconds, the circuit is opened through anode 13 and closed through anode 14 by movement of contact arm 23 of the switch into contact with fixed contact 30 which is electrically connected to anode 13 through conductor 31. After withdrawal of direct electrical current from anode 14 for a period of preferably from about 0.005–2 seconds, the circuit is opened through 14 and closed through anode 15 by moving contact arm 23 into contact with fixed contact 32 electrically connected to anode 15 through conductor 33. After withdrawal of direct electrical current from anode 15 for a non-lengthy period of preferably from about 0.005–2 seconds, the circuit is opened through anode 15 by moving contact arm 23 out of contact with fixed contact 32. The intermittent loading of each of anodes 13, 14 and 15 can then be repeated as previously described.

Switch 22 can be a manual switch, but is preferably an automatic electrically operated switch controlled by a timer 35.

The body or supporting portion of the anodes and cathode is preferably porous and can be fabricated of conductive or non-conductive materials. Where non-conductive materials are used, means are provided to carry the current from the electrodes, for instance a metallic screen in contact with the catalyst of each of the electrodes.

Fuels which can be utilized include liquid oxygen-containing organic compounds such as alcohols, e.g. methanol, ethanol, etc., or carboxylic acids, e.g. formic acid; aldehydes, petroleum oils and solid carbonaceous fuels, for instance coal slurried in a liquid such as water; or sugar or starch; and gaseous hydrocarbons such as nataural gas, methane, ethane and propane. Butane and pentane to hexadecane inclusive could also be used as fuel.

Exemplary of the oxidizing gas that can be used are atmospheric air, oxygen-enriched air, and oxygen per se. In cells of suitable design liquid oxidants such as solutions of nitrosyl-sulfuric acid and ceric sulfate may be used.

With reference to the embodiment in FIGURE 2, two fuel cells 36 and 37 each comprise container 38 and 39 respectively. Containers 38 and 39 are compartmented with ion exchange membranes 38a and 39a. In fuel cell 36, ion exchange membrane 38a separates anode compartment 40 from cathode compartment 41. The anode and cathode compartments 40 and 41 house an anode assembly 42 and a cathode assembly 43 respectively. Fuel cell 37 similarly contains ion exchange membrane 39a separating anode and cathode compartments 45 and 46 which contain an anode assembly 47 and a cathode assembly 48, respectively. The anode and cathode assemblies 42, 47, 43 and 48 of fuel cells 36 and 37 each comprises an electrolyte, preferably an acid for organic fuels, absorbed in a sheet of porous absorbent such as commercial filter paper-like fibrous ceramic called "Fiberfrax" which on one face is adjacent ion exchange membrane 38a (in fuel cell 36) and 39a (in fuell cell 37), and on the opposite face covered with a deposit of platinum black catalyst, the catalyst contacting a current collector such as a screen of fine gauge platinum wire, which wire provides means to withdraw current from the cell. In the place of platinum black, other precious metals previously disclosed including the platinum group metals could be used. Such wire screens may be composed of other suitable conductive material. The anode assemblies function as fuel electrodes and the cathode assemblies as oxygen electrodes.

Switch 50 is an electrically operated switch controlled by timer 51, which was a conventional timer obtainable under the trademark "Model 3 Repeat Cycle Timer" from the G. C. Wilson Company. Such a timer-controlled switch is preferred herein for it enables more rapid switching on and off each anode of each of fuel cells 36 and 37. Switch 50 includes movable contact arm 52 connected to current control instrument panel 53 which is a conventional control instrument panel including conductors 54 and 55, ammeter 56, resistance 57, conductor 58 and voltmeter 59 electrically connected to conductors 54 and 58. Fixed contacts 60 and 61, which cooperate with movable contact arm 52 in making and breaking the circuit to intermittently load each of the anode assemblies 42 and 47 of cell 36 and 37, are electrically connected to their respective anode. Fixed contact 60 is electrically connected to anode assembly 42 through conductor 62, ammeter 63, and conductors 64 and 65 to anodic terminal 66. Anodic terminal 66 is electronically connected with anode assembly 42 through conductor element 67. Fixed contact 61 is electrically connected to anode 47 through conductor 69, ammeter 70 and conductors 71 and 72 to anodic terminal 73 of cell 37. Anodic terminal 73 is electronically connected with anode assembly 47 through conductor element 74.

Cathode terminals 76 and 77 of fuel cells 36 and 37, which are electronically connected with cathode assemblies 43 and 48 respectively through conductor elements 75 and 75a respectively, are also permanently electronically connected together through conductors 78, 79, and 80. Gas impervious membranes 38a and 39a are disposed in cells 36 and 37 respectively and divide these two cells into their respective anode and cathode compartments. Gas impervious membranes 38a and 39a, which provide a gas tight separation between the anode and cathode compartments, were pretreated with electrolyte prior to assembling the cell in order to form a homogeneous electrolyte with the two cell electrode assemblies.

Reference electrode 85, which is a commercial saturated calomel reference electrode, is in electro-chemical contact with the electrolytes of cells 36 and 37. The gas-impervious ion exchange membranes 38a and 39a, which as indicated above form a part of the electrolytes, have extensions 86 and 87, respectively, such extensions being in electrolytic contact with the fiber tip (not shown) of the calomel electrode through a liquid junction (not shown).

Potentiometer 89 is electronically connected to reference electrode 85 by conductor 90. A Zeromatic potentiometer, which is a conventional instrument obtainable in commerce, was used as potentiometer 89 to obtain individual readings of the anode potentials. Potentiometer 89 was electrically connected to moveable contact arm 91 through conductor 92. Contact arm 91 is depressed into contact with either of contacts 93 or 94 according to whether the potential is to be read from anode assembly 42 of cell 36 or anode assembly 47 of cell 37. To obtain a reading of the anode potential in cell 36, contact arm 91 is depressed into contact with contact 93, which is electrically connected to anode 42 through conductors 95 and 65 and through terminal 66 previously mentioned. To obtain an anode potential reading of cell 37, arm 91 is moved into contact with contact 94 electrically connected to anode assembly 47 through conductor 96 and through conductor 72 to anodic terminal 73 as previously mentioned.

Oxidizing gas, for instance oxygen per se, air or oxygen-enriched air, is fed to each of cathode assemblies 43 and 48 in fuel cells 36 and 37 respectively through conduits 97 and 98 respectively. Conduits 97 and 98 are equipped with flow control valves 99 and 100 respectively and with rotameters 101 and 102 respectively. Conduits 103 and 104 lead from rotameters 101 and 102 respectively to cathode compartments 41 and 46 respectively. The effluent gas exits from each of the cathode compartments of the fuel cells through lines 103a and 104a.

Fuel is supplied to anode assemblies 42 and 47 of the fuel cells by means of saturator vessel 106 containing liquid methanol 107, saturator 106 having a nitrogen gas supply conduit 108 extending through two hole stopper 109 and beneath the surface of the liquid fuel. Fuel supply conduit 110 extends into the upper portion of saturator vessel 106 through the other orifice of stopper 109, and terminates well above the surface of the liquid fuel. Conduit 110 is divided into supply conduits 111 and 112 which are equipped respectively with flow control valves 113 and 114 and rotameters 115 and 116. Supply conduits 117 and 118 lead from the rotameters 115 and 116 respectively to anode compartments 40 and 45 respectively of the two fuel cells. The effluent gas passes from each of the anode compartments of the fuel cells through lines 117a and 118a.

In operation, $N_2$ is passed through line 108 and line 110 carries a stream of $N_2$ saturated with methanol vapor to anode assemblies 42 and 47 through conduits 111 and 117 and conduits 112 and 118. Other of the fuels previously disclosed can be utilized, if desired, in place of the methanol, and the fuel could also be utilized in liquid phase instead of gaseous or vapor phase. Oxygen or another of the oxidizing gases previously disclosed is passed through conduits 97 and 103 into contact with cathode assembly 43 into fuel cell 36, and also through conduits 98 and 104 into contact with cathode assembly 48 in fuel cell 37.

With contact arm 52 of switch 50 in contact with fixed contact 61 as shown, the circuit comprising current control instrument panel 53, conductors 120, 80, terminal 77, conductor 75a, cathode assembly 48, the electrolyte in fuel cell 37, anode assembly 47, conductor 74, terminal 73 and conductors 72, 71 and 69 is closed whereby anode assembly 47 is loaded and direct electrical current withdrawn therefrom. With contact arm 52 of switch 50 in its broken line position in contact with fixed contact 60, the circuit mentioned immediately above is opened and the circuit comprising current control instrument panel 53, conductors 120, 79, 78, terminal 76, conductor 75, cathode assembly 43, the electrolyte in fuel cell 36, anode assembly 42, conductor 67, terminal 66, conductors 65, 64 and 62 is closed resulting in loading of anode assembly 42 with withdrawal of direct electrical current from this anode.

Timer 51 is so set or adjusted as to switch on and off fuel cells 37 and 36 at the intervals desired and to periodically load the anode assembly 47 or anode assembly 42 of cell 37 or 36 respectively for the time periods desired. The time of loading each anode of each fuel cell and the time allowed on open circuit of each anode of this embodiment is a function of the rate of formation or building up and of decay of anodic polarization similarly as in the FIGURE 1 embodiment. The build up and decay of the polarization may require unequal time periods. In such case more than two anodes would be operated intermittently. Preferred time periods of loading and depolarizing each anode of the FIGURE 2 embodiment are from about 0.005–100 seconds.

The following examples further illustrate the invention. In the examples all potentials are reported in accordance with the Stockholm Convention.

EXAMPLE I

Two fuel cells were provided each having one anode and one cathode spaced from the anode, the anodes and cathodes of the cells being contacted on one side with electrolyte which was 3 N $H_2SO_4$. The cells were constructed and operated according to the embodiment shown in FIGURE 2. Methanol vapor carried by nitrogen was swept through the anode compartments, and oxygen was passed through the cathode compartments. The cells were operated at room temperature with intermittent loading of the anode of each cell, current being drawn alternately from the two anodes at a frequency of 60 cycles per second (c.p.s.). Thus the current densities listed in Table I hereafter set forth were only applied half of the total time per each anode (disregarding the switching time of about 3 microseconds). The results are set forth in Table I below:

*Table I*

[Intermittent operation of methanol fuel cell. Platinum black electrodes, 3 N $H_2SO_4$, room temperature. Anode potentials vs. standard hydrogen electrode. Frequency: 60 c.p.s.]

| Time, Cumulative (Min.) | Fuel Feed | Anode Current Density, ma./cm.$^2$ | Anode Potentials, Volts | |
|---|---|---|---|---|
| | | | Anode I | Anode II |
| 60 | $H_2$ | 10.1 | .03 | .04 |
| 120 | 8.5% $CH_3OH$ | 8.1 | .455 | .475 |
| 150 | 8.5% $CH_3OH$ | 10.1 | .49 | .51 |
| 180 | 8.5% $CH_3OH$ | 14.2 | .49 | .525 |
| 190 | 8.5% $CH_3OH$ | 18.2 | .49 | .525 |
| 205 | 8.5% $CH_3OH$ | [1] 13.0 | .695 | |
| 210 | 8.5% $CH_3OH$ | 24.3 | .465 | .50 |
| 220 | 6% $CH_3OH$ | 16.2 | .48 | .55 |
| 1,060 | 6% $CH_3OH$ | 16.2 | .48 | .55 |
| 1,080 | 7% $CH_3OH$ | 16.2 | .48 | .56 |

[1] Operated 15 minutes with continuous loading of Anode I.

The preliminary 60-minute operation with hydrogen served the purpose of assuring that the platinum was completely reduced, and therefore at full activity. After the $H_2$ flow was stopped and replaced by methanol vapor-$N_2$, no readings were taken for the first 30 minutes in order to be sure that the last residual traces of $H_2$ were removed from the anode compartment. As shown in Table I, at current densities in the range of about 8–24 ma./cm.$^2$ the potentials were about .45 to .49 volt with one of the anodes (anode I) and about .47 to .56 volt with the other anode (anode II). However, when in the period between 190 and 205 minutes, anode I was loaded without interruption with 13 ma./cm.$^2$ while anode II was left on open circuit the potential of working anode I deteriorated to about .7 volt. Thus it is readily seen that intermittent operation reduced anodic polarization.

EXAMPLE II

In this example, a single fuel cell was used. The cell employed was similar in construction to the individual cells shown in schematic form in FIGURE 2. The cell contained one anode and one cathode. The electrolyte was 3 N $H_2SO_4$ and the fuel was formic acid. The anode was operated either intermittently at 60 c.p.s. or, for comparative purposes, continuously. The intermittent operation of this example differs from the intermittent operation of Example I in that no second anode was used during the recovery periods. With the rapid cycle of 60 c.p.s. steady readings were obtained.

After the anode was conditioned by feeding $H_2$ to the anode for 70 minutes, the feed was changed to formic acid. Formic acid vapor was carried to the anode compartment on a $N_2$ stream. The room temperature vapor pressure of formic acid is comparatively low as compared to methanol. The saturated nitrogen-formic acid vapor mixture only contains 4.5% formic acid vapor. In addition, the electrochemical oxidation equivalent of one mol of formic acid equals only one third of a mol of methanol. Thus with our vapor sweep-type feed system an occasional shortage in fuel may occur at the anode catalyst. To prevent this, the formic acid vapor feed was supplemented by occasional injections of 0.5 cc. of liquid formic acid into the anode assembly as indicated in Table II.

The "apparent" current density listed in Table II is the ammeter reading divided by the anode area. This value is also the "actual" current density in the continuous operation. In the periods of intermittent operation, however, the current was applied only half of the total time to the anode. Thus the "actual" current density in intermittent operation was twice the measured value, because with 60 c.p.s., the ammeter shows a constant non-fluctuating current rate which is half of the actual rate that prevails during the actual load periods.

The results of the test are set forth in Table II below:

Table II

| Time in Minutes | | Fuel | Current Density (ma./cm²) | | Operation | Anode Potential (Volts) |
| --- | --- | --- | --- | --- | --- | --- |
| Since Previous Reading | Cumulative | | Apparent | Actual | | |
| 70 | 70 | H₂ | 10.1 | 20.2 | 60/sec | +0.015 |
| 60 | 130 | 4.5%HCOOH in N₂* | 4 | 8 | 60/sec | +0.49 |
| 30 | 160 | 4.5%HCOOH in N₂ | 4 | 4 | Continuous | +0.51 |
| 30 | 190 | 4.5%HCOOH in N₂ | 4 | 8 | 60/sec | +0.49 |
| 30 | 220 | 4.5%HCOOH in N₂* | 4 | 4 | Continuous | +0.50 |
| 30 | 250 | 4.5%HCOOH in N₂ | 12.1 | 24.2 | 60/sec | +0.55 |
| 30 | 280 | 4.5%HCOOH in N₂* | 12.1 | 12.1 | Continuous | +0.64 |
| 25 | 305 | 4.5%HCOOH in N₂ | 12.1 | 24.2 | 60/sec | +0.68 |
| 5 | 310 | 4.5%HCOOH in N₂* | 12.1 | 24.2 | 60/sec | +0.53 |
| 25 | 335 | 4.5%HCOOH in N₂ | 12.1 | 12.1 | Continuous | +0.03 |

*Injected 0.5 cm.³ HCOOH into anode at beginning of the period.

The data in Table II show that intermittent operation at a current density of 8 ma./cm.² resulted in a lower polarization of the anode than continuous operation at 4 ma./cm.². Similar results are evident in the table at higher current densities. Thus the data indicate that at the same overall current density, intermittent operation results in lower polarization than at continuous operation.

Since the polarization of the particular system is a function of time as well as current density, it is anticipated that a further reduction in polarization would be effected if the frequency and pattern of cycle would be better adjusted to the pattern of polarization and depolarization of each individual fuel at the prevailing conditions.

It will be obvious to those skilled in the art that many modifications may be made within the scope of the present invention without departing from the spirit thereof, and the invention includes all such modifications.

What is claimed is:

1. A process for the production of electrical energy, which comprises maintaining a fuel in contact with a plurality of anodes in a fuel cell, the anodes being in contact with an electrolyte, passing an oxidant in contact with a cathode in the cell, the cathode also being in contact with the electrolyte, withdrawing electrical current from an anode until prior to maximum polarization of the anode, and then switching to a substantially non-polarized anode for withdrawal of electrical current therefrom until prior to maximum polarization of the anode, the first-mentioned anode undergoing depolarization during the non-withdrawal of current therefrom, the time of withdrawing current from each anode being a function of the rate of formation of anodic polarization.

2. The process of claim 1 wherein the fuel is an organic fuel and the electrolyte an acid electrolyte.

3. A process for the production of electrical energy, which comprises maintaining an organic fuel in contact with a plurality of porous catalytic anodes in a fuel cell, the anodes being spaced apart in an acid electrolyte, passing an oxidizing gas in contact with a porous catalytic cathode also in the electrolyte in the cell, withdrawing electrical current from an anode until prior to maximum polarization of the anode, and then switching to a substantially non-polarized anode for withdrawal of electrical current therefrom until prior to maximum polarization of the anode, the first-mentioned anode undergoing depolarization during the non-withdrawal of current therefrom, the time of withdrawing current from each anode being a function of the rate of formation of anodic polarization.

4. The process of claim 3 wherein the time of withdrawing current from each anode is from about 0.005–100 seconds.

5. A process in accordance with claim 3 wherein the anodes and cathode have a platinum group metal as catalyst thereon.

6. A process in accordance with claim 5 wherein the platinum group metal is selected from the group consisting of platinum, palladium, iridium, ruthenium, rhodium and mixtures thereof.

7. A process in accordance with claim 3 wherein the fuel is an oxygen-containing organic compound.

8. A process for the production of electrical energy, which comprises maintaining an organic fuel in contact with a plurality of porous catalytic anodes in a fuel cell, the anodes being spaced apart in an acid electrolyte, passing an oxidiing gas in contact with a porous catalytic cathode also in the electrolyte in the cell, withdrawing electrical current from an anode until prior to maximum polarization of the anode, and then switching to a substantially non-polarized anode for withdrawal of electrical current therefrom until prior to maximum polarization of the anode by switching the electrically conductive member into position for current withdrawal from said other anode, the first-mentioned anode undergoing depolarization during the non-withdrawal of current therefrom, the time of withdrawing current from each anode being a function of the rate of formation of anodic polarization.

9. The process of claim 8 wherein the time period of loading each anode is from about 0.005–2 seconds.

10. A process for the production of direct current electrical energy, which comprises passing a fuel in contact with an anode in a fuel cell, passing an oxidant in contact with a cathode also in the cell and separated from the anode, the fuel cell having an electrolyte therein wetting the anode and cathode, passing a fuel in contact with an anode in another fuel cell, passing an oxidant in contact with a cathode in the last-mentioned cell and separated from the anode, the last-mentioned cell also having an electrolyte therein wetting the anode and cathode, withdrawing electrical current from an anode of one of the fuel cells through an electrically conductive member until prior to maximum polarization of the anode, the last-mentioned anode included in a circuit also including the corresponding electrolyte, cathode and an external circuit portion including the conductive member and a switch, and then switching to a substantially non-polarized anode of the other cell for withdrawal of electrical current therefrom until prior to maximum polarization of the anode, the last-mentioned anode included in another circuit also including the corresponding electrolyte, cathode and an external circuit portion including an electrically conductive member and the switch, the cell anode of the first-mentioned current withdrawal undergoing depolarization during the non-withdrawal of current therefrom, the time of withdrawing current from the anode of each cell being a function of the rate of formation of anodic polarization.

11. A process for the production of direct current electrical energy, which comprises passing an organic fuel in contact with an anode in a first fuel cell, passing an oxidant in contact with a cathode also in the cell and separated from the anode, the fuel cell having an acid electrolyte therein wetting the anode and cathode, passing an organic fuel in contact with an anode in a second fuel cell, passing an oxidant in contact with a cathode also in the cell and separated from the anode, the second cell also having an acid electrolyte therein wetting the anode and cathode, withdrawing electrical current from an anode of one of the fuel cells through an electrically conductive member until prior to maximum polarization of the anode, the last-mentioned anode included in a circuit also including the corresponding electrolyte, cathode and an external circuit portion including the conductive member and the switch, and then switching to a substantially non-polarized anode of the other cell for withdrawal of electrical current therefrom, the last-mentioned anode included in another circuit also including the corresponding electrolyte, cathode and an external circuit portion including an electrically conductive member and the switch, the time of withdrawing current from the anode of each cell being a function of the rate of formation of anodic polarization.

12. The process of claim 11 wherein the time period of withdrawing current from each anode is from about 0.005–100 seconds.

13. In combination, a fuel cell comprising an electrolyte, a plurality of anodes spaced apart in the electrolyte, a cathode in the electrolyte spaced apart from the anodes, means for supplying a fuel in contact with the anodes, means for supplying an oxidant in contact with the cathode, switch means, a timer, the switch means being operable under the control of the timer, and circuit means including the cathode, switch means, anodes and the electrolyte, the timer-controlled switch means being adapted to close the circuit through any of the anodes for withdrawal of direct electrical current therefrom until prior to maximum polarization of the anode and then open the circuit and close the circuit through another substantially non-polarized anode for withdrawal of direct electrical current therefrom until prior to maximum polarization of the last-mentioned anode, the anode of the previously closed and then opened circuit undergoing depolarization during non-withdrawal of electrical current therefrom.

14. In combination, a fuel cell comprising an electrolyte, a plurality of porous catalytic anodes spaced apart in the electrolyte, a porous catalytic cathode in the electrolyte spaced apart from the anodes, means for maintaining a fuel in contact with the anodes, means for passing an oxidizing gas in contact with the cathode, switch means, a timer, the switch means being operable under the control of the timer, and circuit means including the cathode, switch means, anodes and the electrolyte, the timer-controlled switch means being adapted to close the circuit through any of the anodes for withdrawal of direct electrical current therefrom until prior to maximum polarization of the anode and then open the circuit and close the circuit through another substantially non-polarized anode for withdrawal of direct electrical current therefrom until prior to maximum polarization of the last-mentioned anode, the anode of the previously closed and then opened circuit undergoing depolarization during non-withdrawal of electrical current therefrom.

15. Apparatus for the production of direct current electrical energy which comprises a first fuel cell and a second fuel cell, each fuel cell comprising an anode, a cathode separate from said anode, and an electrolyte therein wetting the anode and cathode, means for supplying a fuel in contact with the anode of each cell, means for supplying an oxidant in contact with the cathode of each cell, switch means, a timer, the switch means being operable under the control of the timer, first circuit means including the first cell cathode, the switch means, the first cell anode and the first cell electrolyte, and second circuit means including the second cell cathode, the switch means, the second cell anode and the second cell electrolyte, the timer-controlled switch means being adapted to close one of said circuits for withdrawal of direct electrical current from the anode of the corresponding fuel cell until prior to maximum polarization of the anode and then open the circuit and close the circuit through the other circuit for withdrawal of direct electrical current from a substantially non-polarized anode of the other fuel cell until prior to maximum polarization of the last-mentioned anode, the cell anode of the previously closed and then opened circuit undergoing depolarization during non-withdrawal of electrical current therefrom.

16. Apparatus for the production of direct current electrical energy, which comprises a first fuel cell and a second fuel cell, each fuel cell comprising a porous catalytic anode, an electrolyte, a porous catalytic cathode in the electrolyte spaced from the anode, means for passing a fuel in contact with the anode, and means for passing an oxidizing gas into contact with the cathode; switch means, a timer, the switch means being operable under the control of the timer, first circuit means including the first cell cathode, the switch means, the first cell anode and the first cell electrolyte, and second circuit means including the second cell cathode, the switch means, the second cell anode and the second cell electrolyte, the timer-controlled switch means being adapted to close one of said circuits for withdrawal of direct electrical current from the anode of the corresponding fuel cell until prior to maximum polarization of the anode and then open the circuit and close the circuit through the other circuit for withdrawal of direct electrical current from a substantially non-polarized anode of the other fuel cell until prior to maximum polarization of the last-mentioned anode, the cell anode of the previously closed and then opened circuit undergoing depolarization during non-withdrawal of electrical current therefrom.

17. A process for the production of electrical energy in a fuel cell having a number of anodes, a cathode, and an electrolyte in contact with the anodes and cathode, which comprises contacting the cell anodes with a fuel, contacting the cell cathode with an oxidant, and withdrawing electrical current from the anodes one at a time and in such manner as to switch from one anode to another substantially non-polarized anode prior to maximum polarization of the first-mentioned anode, the first-mentioned anode undergoing depolarization during the non-withdrawal of current therefrom, the time of withdrawing current from each anode being a function of the rate of formation of anodic polarization.

18. The process of claim 17 wherein the fuel is an organic fuel, the electrolyte an acid electrolyte, and the anodes and cathode porous catalytic anodes and cathode.

References Cited by the Examiner

UNITED STATES PATENTS

| 108,513 | 10/70 | Pierson | 320—19 |
| 683,444 | 10/01 | Cowen | 320—19 |
| 2,384,463 | 9/45 | Gunn et al. | 136—86 |
| 2,925,454 | 2/60 | Juste et al. | 136—86 |
| 2,925,455 | 2/60 | Eidensohn et al. | 136—86 |

FOREIGN PATENTS 1,236,358  6/60  France.

WINSTON A. DOUGLAS, *Primary Examiner.*

JOHN R. SPECK, JOHN H. MACK, *Examiners.*